(12) United States Patent
Halna du Fretay et al.

(10) Patent No.: US 7,855,955 B2
(45) Date of Patent: Dec. 21, 2010

(54) METHOD FOR MANAGING FRAMES IN A GLOBAL-AREA COMMUNICATIONS NETWORK, CORRESPONDING COMPUTER-READABLE STORAGE MEDIUM AND TUNNEL ENDPOINT

(75) Inventors: Tristan Halna du Fretay, Rennes (FR); Philippe Boucachard, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 12/258,104

(22) Filed: Oct. 24, 2008

(65) Prior Publication Data
US 2009/0129389 A1    May 21, 2009

(30) Foreign Application Priority Data
Nov. 16, 2007    (FR) .................................. 07 59111

(51) Int. Cl.
    *G01R 31/08* (2006.01)
(52) U.S. Cl. .................................................... 370/229
(58) Field of Classification Search ........................ None
    See application file for complete search history.

(56) References Cited

U.S. PATENT DOCUMENTS

| | | | | |
|---|---|---|---|---|
| 5,870,386 A | | 2/1999 | Perlman et al. ............. | 370/256 |
| 6,343,330 B1 | | 1/2002 | Khanna et al. .............. | 709/249 |
| 7,134,012 B2 | * | 11/2006 | Doyle et al. ................. | 713/151 |
| 2004/0213237 A1 | * | 10/2004 | Yasue et al. ................. | 370/392 |
| 2006/0013221 A1 | * | 1/2006 | De Cnodder et al. ........ | 370/389 |

* cited by examiner

*Primary Examiner*—Chi H Pham
*Assistant Examiner*—Fan Ng
(74) *Attorney, Agent, or Firm*—Fitzpatrick, Cella, Harper & Scinto

(57) ABSTRACT

A method for managing frames in a global-area communications network comprises a plurality of sub-networks linked to one another by tunnels at the ends of which there are tunnel endpoints, at least one of the sub-networks comprising at least one source device connected to one of said tunnel endpoints through said sub-network. When a given tunnel endpoint receives from a local sub-network, to which said given tunnel endpoint is connected, a frame sent out by a source device in the global-area network, the given tunnel endpoint performs the following steps: obtaining, from said frame, an address of the source device; verifying that the obtained address is included in a first list of addresses comprising addresses associated with source devices connected to remote sub-network or sub-networks distinct from the local sub-network; and in the event of positive verification, discarding said frame.

9 Claims, 10 Drawing Sheets

METHOD FOR MANAGING FRAMES IN A GLOBAL-AREA COMMUNICATIONS NETWORK, CORRESPONDING COMPUTER-READABLE STORAGE MEDIUM AND TUNNEL ENDPOINT

FIELD OF THE INVENTION

The field of the invention is that of communications networks.

More specifically, the invention relates to a technique for the management of frames traveling between local communications networks by communications tunnels.

More specifically again, the invention relates to a technique for preventing data path loops.

TECHNOLOGICAL BACKGROUND

The technology of virtual private networks (VPN) enables transparent, real-time secured communication between individuals sharing a same field of interest while at the same time using the Internet structure which is unreliable and yet inexpensive.

To communicate transparently and remove the need for non-routable addresses, VPNs use a special encapsulation known as tunneling which creates what is called a tunnel. This operation consists in encapsulating a level A protocol (embedded protocol) in a level B protocol (transport protocol) using an encapsulation protocol C, B being a protocol with a layer of a level higher than or equal to that of A, in a layered model such as the OSI model which describes the services by each of these layers and their interactions.

Here below in the description, by way of an example only, level 2 VPNs are considered, i.e. levels of encapsulation in a level 2 tunnel (a level 2 tunnel means that the embedded protocol is a layer 2 protocol of the OSI model).

The VPNs are often used to interconnect two LANs (local area networks) in order to create a virtual local area network formed by the union of the original two LANs. Secured VPNs include a cryptography and authentication algorithm to guarantee the secrecy of the transported data. A typical VPN configuration based on a tunneling technique is illustrated in FIG. 1a (described in detail here below). In this example, the tunnel endpoints are not integrated in the gateways. The tunnel is set up between two tunnel endpoints and each packet (also called a frame) sent to an apparatus connected to the remote LAN is encapsulated by the local tunnel endpoint and then sent to the remote tunnel endpoint which will de-encapsulate and send it on the remote LAN. An apparatus then is unable, from the source address of a received frame, to determine if it has originated from a local LAN or from a remote LAN. Communication between two apparatuses through the tunnel is called end-to-end communication.

Conventionally, an apparatus known as a bridge is used to connect two disjoined segments (LANs) of a network. An apparatus of this kind corresponds to the layer 2 of the OSI model. Indeed, a bridge is used to filter the frames of the network as a function of their destination address without however being concerned with their content. This therefore increases the maximum distance between two stations (also called source devices or source apparatuses) but also reduces the load observed on each segment. Furthermore, the bridge reduces collision, thus heightening the performance of each segment and therefore of the global-area network. However, the bridge does not enable any filtering of the broadcast or multicast type frames and requires the computation of a spanning tree to prevent data path loops, which create especially message duplication problems.

Algorithms for determining the spanning tree are well known to those skilled in the art and are therefore not described in detail. For example, a description of such an algorithm can be found in the IEEE 802.1D standard. A spanning tree determining algorithm consists in selecting a root bridge and, from this root, in determining a tree of loop-free data path(s) used to communicate by broadcast type messages with all the nodes of the communications network, and in blocking, in the bridges, certain ports connected to redundant paths. The drawback of such a spanning-tree determining technique is that, in certain cases, the non-looped data path is not optimized whereas it could be shorter. Thus, the latency can increase. It may be recalled that latency is the time taken by a frame to travel between the original station and the final destination of the network. Furthermore, spanning-tree determining techniques require the implementation of lengthy and complex protocols to obtain information on topology needed for the detection of the loops and for the configuration of the different nodes in order to eliminate these loops.

A second prior-art technique for preventing data path loops consists of the selection of only one active tunnel endpoint per LAN (several tunnels can be connected to this active tunnel endpoint) and in configuring this active tunnel endpoint in order to prohibit any frame transfer from tunnel to tunnel. The only frame transfers permitted are from one LAN to one or more tunnels connected to it and from one tunnel connected to a LAN towards this LAN. More specifically, if several stations are activated simultaneously on a same LAN, then one of them is selected to create and manage the tunnels while the other stations deactivate their tunnel endpoint functions. This second technique is presented especially in the U.S. Pat. No. 5,870,386.

The major drawback of this second prior art technique lies in the fact that it does not enable the simultaneous functioning of several tunnel endpoints in a same LAN. In this technique, only one station (called an active station) must support the entire load of managing the tunnels. This technique is therefore not suited to cases of active stations having only limited computation and processing resources such as for example camcorders, cameras or again printers.

A third technique, presented especially in the U.S. Pat. No. 6,343,330, proposes to implement a proxy type mechanism.

Such a mechanism prevents data path loops by replacing the source address of an incoming frame arriving from a tunnel to a LAN with the address of the incoming tunnel endpoint. This third prior art technique therefore relies on the fact that each tunnel endpoint knows the address of the other tunnel endpoints presenting the LAN. Thus, the tunnel endpoints are able to decide if a frame should or should not be transmitted on the tunnel. For example, if the source address of the frame is that of another tunnel endpoint, then the packet is described by the tunnel endpoint that has received it.

However, this third prior art technique has a certain number of drawbacks.

First of all, this technique is a complex one (entailing the replacement of source addresses) and costly (in terms of cost of the proxy mechanism and of induced latency).

Furthermore, in certain cases, these proxy mechanisms are not suited to end-to-end communications especially because they involve compromises as regards end-to-end security (especially the security of the network layer such as the IPsec) especially inasmuch as they modify a part of the frames traveling through them.

GOALS OF THE INVENTION

The invention, in at least one embodiment, is aimed especially at overcoming these different drawbacks of the prior art.

More specifically, in at least one embodiment of the invention, it is a goal of the invention to provide a frame management technique that can be used to prevent data path loops and is simple to implement and costs little.

It is another goal of at least one embodiment of the invention to provide a technique of this kind that can be implemented in tunnel endpoints and is therefore transparent to the source and destination apparatuses.

It is another goal of at least one embodiment of the invention to provide a technique of this kind enabling the most efficient possible distribution of the management load of the tunnels among the apparatuses present in a given LAN.

It is an additional goal of at least one embodiment of the invention to provide a technique of this kind that is especially well-suited to the case of end-to-end communications.

SUMMARY OF THE INVENTION

A particular embodiment of the invention proposes a method for managing frames in a global-area communications network which comprises a plurality of sub-networks linked to one another by tunnels at the ends of which there are tunnel endpoints, at least one of the sub-networks comprising at least one source device, wherein when a given tunnel endpoint receives, from a local sub-network, to which said tunnel endpoint is connected, a frame sent out by a source device in the global-area network, the given tunnel endpoint performs the following steps:

obtaining, from said frame, an address of the source device;

verifying that the address is included in a first list of addresses comprising addresses associated with source devices connected to remote sub-network or sub-networks distinct from the local sub-network; and in the event of positive verification, discarding said frame.

Thus, the invention relies on a wholly novel and inventive approach to the management of a frame traveling through a communications tunnel. Indeed, the invention relies on the identification of the origin of the frame from the source address contained in the frame which identifies the source device that has sent out the frame. The invention therefore proposes to use a list of addresses comprising the addresses of the source devices present on the remote sub-network (or LAN). In a particular embodiment, each tunnel endpoint of a sub-network possesses a list of this kind and therefore knows the identity of each remote source device (i.e. each source device present in a remote sub-network). Thus, when a frame received by a tunnel endpoint coming from the sub-network (or LAN) to which it belongs has originated in a source device which is in a remote network (i.e. if the source address of the source device is included in the list), the frame is destroyed by the tunnel endpoint.

This technique prevents data path loops while at the same time preserving simplicity in the architecture of the tunnel endpoints (there is no proxy type mechanism and modification of the processed frames).

Advantageously, the given tunnel endpoint obtains the first list of addresses in performing the following steps:

for each tunnel endpoint of the local sub-network, distinct from the given tunnel endpoint, obtaining a second list of addresses on the basis of information received from said each tunnel endpoint, this second list of addresses comprising addresses associated with source devices belonging to the remote sub-network or sub-networks connected to said local sub-network via said tunnel endpoint;

determining a third list of addresses comprising addresses associated with source devices belonging to the remote sub-network or sub-networks connected to said local sub-network via said given tunnel endpoint;

generating said first list of addresses from said second and third lists of addresses.

The list (called a first list) used to identify the origin of the frame is obtained in concatenating the information contained in distinct sub-lists (called second and third lists). More specifically, each tunnel endpoint of the local network receives a sub-list of source device addresses from the other tunnel endpoints of the local area network, these source devices being connected by the remote sub-networks connected to the local sub-network by said other tunnel endpoints of the local area network. In this way, the current tunnel endpoint receives the lists from the other tunnel endpoints present in the local area network. Thus, the current tunnel endpoint can generate the list (called a first list) comprising the source addresses of the source devices present in the remote networks, in combining the addresses of the second list and those of the third list, the third list being the list of the addresses of the devices connected to the sub-network(s) linked to the local sub-network by means of tunnels whose current tunnel endpoint is one end.

Advantageously, when a tunnel endpoint receives a frame sent out by a source device, said frame reaches said tunnel endpoint by one of the tunnels, said incoming tunnel linking the sub-network to which said tunnel endpoint is connected to the remote sub-network to which the source device is connected, said tunnel endpoint performs the following steps:

obtaining, from said frame, a remote address corresponding to the address of the source device having sent said frame;

verifying that the remote address is included in a fourth list of addresses comprising addresses associated with source devices belonging to a remote sub-network linked by said incoming tunnel to the sub-network to which said tunnel endpoint is connected;

in the event of negative verification, updating the fourth list with said remote address;

and said first list of addresses is generated from:

the fourth list or lists of addresses managed by each tunnel endpoint of the local sub-network, distinct from the given tunnel endpoint, each fourth list managed by a distinct tunnel endpoint of said given tunnel endpoint being associated with a distinct incoming tunnel; and the fourth list or lists of addresses managed by the given tunnel endpoint, each fourth list managed by said given tunnel endpoint being associated with a distinct incoming tunnel.

Thus, a tunnel endpoint determines the addresses of the source devices connected to the remote sub-network or networks connected to the local sub-network by one or more of the tunnels of which said tunnel endpoint is one end, in analyzing the frames coming from this remote sub-network or these remote sub-networks.

According to an advantageous characteristic, a tunnel endpoint sends each other tunnel endpoint of the sub-network to which said tunnel endpoint is connected a piece of information representing a presence of a new source device in a remote sub-network, said remote sub-network being linked, via said tunnel endpoint, to the sub-network to which said tunnel endpoint is connected.

Thus, when a frame comes from a tunnel to the local sub-network, the tunnel endpoint that is the end of this tunnel in the local sub-network informs the other tunnel endpoints of the local sub-network about the detection of a new hitherto unknown source device. The other tunnel endpoints can thus update the list of source devices of the remote sub-networks (first list) and thus prevent this frame from being sent back to another tunnel, which would then form a loop in the global-area network.

Advantageously, when a tunnel endpoint receives a frame coming from an incoming tunnel of which said tunnel endpoint is one endpoint, said tunnel endpoint engages a transmission delaying mechanism for transmitting said frame on the sub-network to which said tunnel end-point is connected, so long as each of said other tunnel endpoint has not been informed that the source device belongs to a remote sub-network linked, via said incoming tunnel, to the sub-network to which said tunnel endpoint is connected.

Thus, the tunnel endpoint forming the end of the tunnel from which the considered frame has come to the local sub-network ensures that the other tunnel endpoints can update the list of source devices of the remote sub-networks (first list) before making this frame available on the network.

In another embodiment, the invention relates to a computer-readable storage medium storing a computer program, which computer program comprises a set of instruction sequences that, when executed by a computer, implement the method according to at least one of the above-mentioned embodiments.

In another embodiment, the invention concerns a tunnel endpoint designed for the managing frames in a global-area communications network, said network comprising a plurality of sub-networks linked to one another by tunnels at the ends of which there are tunnel endpoints, at least one of the sub-networks comprising at least one source device, said tunnel endpoint comprising means for receiving a frame coming from a local sub-network, to which said tunnel endpoint is connected, the frame being sent out by a source device in the global-area network, wherein the tunnel endpoint comprises:

means for obtaining, from said frame, an address of the source device;

verifying means for verifying that the address is included in a first list of addresses comprising addresses associated with source devices connected to remote sub-network or sub-networks distinct from the local sub-network;

means for discarding said frame, activated in the event of positive verification by said verifying means.

Advantageously, the tunnel endpoint comprises means for obtaining said first list of addresses themselves comprising:

means for obtaining, for each other tunnel endpoint of the local sub-network distinct from the given tunnel endpoint and on the basis of information received from said other tunnel endpoint, a second list of addresses comprising addresses associated with source devices belonging to remote sub-network or sub-networks connected to said local sub-network via said other tunnel endpoint;

means for determining a third list of addresses comprising addresses associated with source devices connected to remote sub-network or networks linked to said local sub-network via said tunnel endpoint;

means for generating said first list of addresses from said second and third list of addresses.

According to an advantageous characteristic, the tunnel endpoint comprises means for transmitting, to each other tunnel endpoint of the sub-network to which said tunnel endpoint is connected, a piece of information representing a presence of a new source device in a remote sub-network, said remote subnetwork being linked via said tunnel endpoint, to the sub-network to which said tunnel endpoint is connected.

Advantageously, the tunnel endpoint comprises:

receiving means for receiving a frame coming from an incoming tunnel of which said tunnel endpoint is one end;

means for activating, upon reception of a frame by said receiving means, transmission delaying means for transmitting said frame on the local sub-network so long as each other tunnel endpoint of the local sub-network has not been informed that the source device is connected to a remote sub-network linked to the local sub-network by said incoming tunnel.

In another embodiment, the invention concerns a method for managing frames in a global-area communications network which comprises a plurality of sub-networks linked to one another by bridges, at least one of the sub-networks comprising at least one source device, wherein when a given bridge portal receives, from a local sub-network, to which said bridge portal is connected, a frame sent out by a source device in the global-area network, the given bridge portal performs the following steps:

obtaining, from said frame, an address of the source device;

verifying that the address is included in a first list of addresses comprising addresses associated with source devices connected to remote sub-network or sub-networks distinct from the local sub-network; and in the event of positive verification, discarding said frame.

This other embodiment differs from the previous one only in that a bridge (comprising two portals) replaces the tunnel and the two associated tunnel endpoints. More precisely, the two bridge portals of this other embodiment play the same role as the two tunnel endpoints of the previous embodiment. Of course, the below detailed description of the embodiment with a tunnel (and the two associated tunnel endpoints) will allow a person skilled in the art to implement the embodiment with a bridge (comprising two portals).

LIST OF FIGURES

Other features and advantages of embodiments of the invention shall appear from the following description, given by way of a non-restrictive indication (not all the embodiments of the invention are limited to the characteristics and advantages of the embodiments described here below) and from the appended drawings, of which:

FIG. 1a illustrates a typical virtual private network (VPN) configuration implementing a tunnel;

FIG. 1b presents an example of a classic layer model of a tunnel endpoint in which the method of the invention can be implemented;

Figure 6:
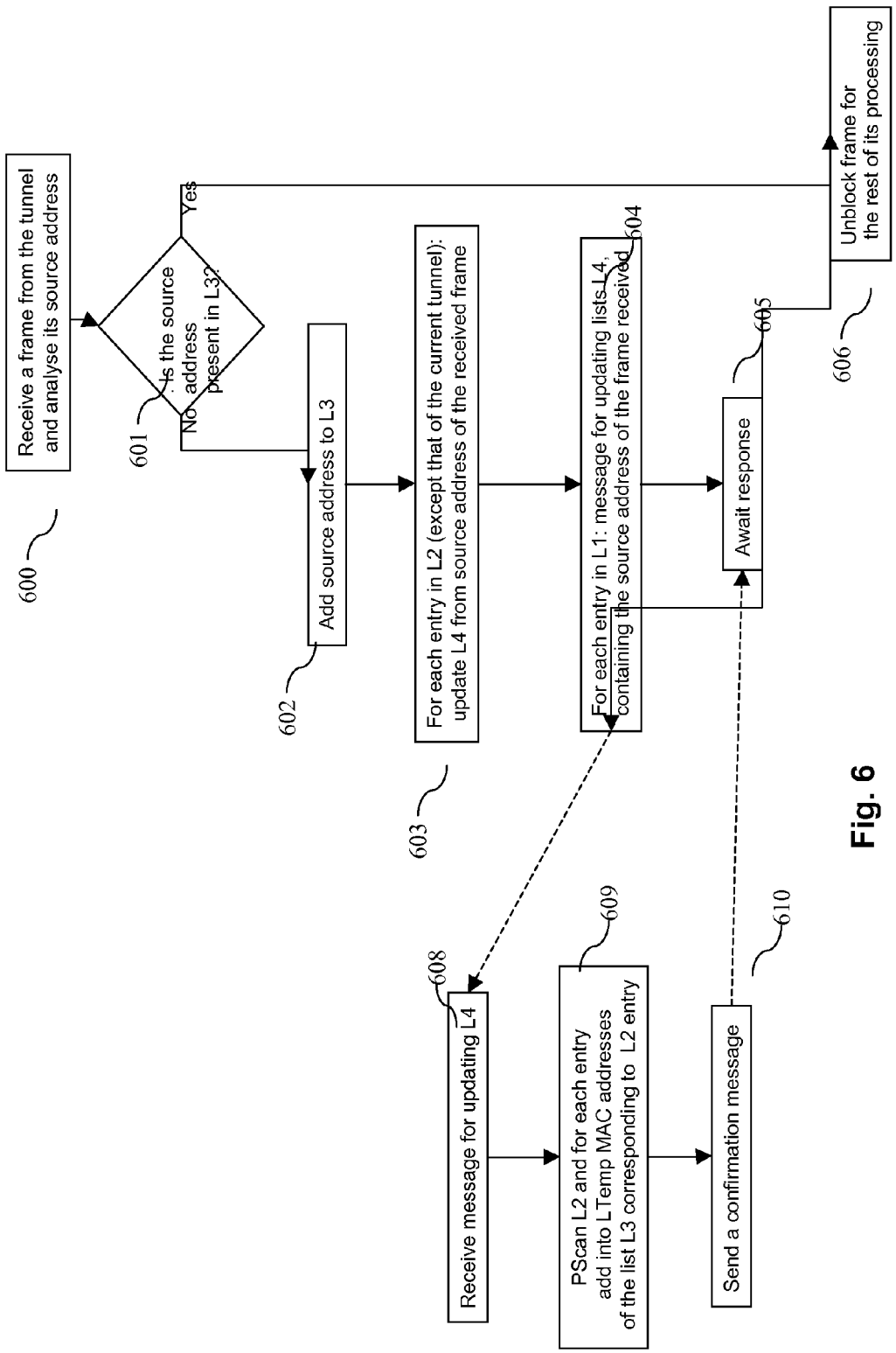
Figure 7:
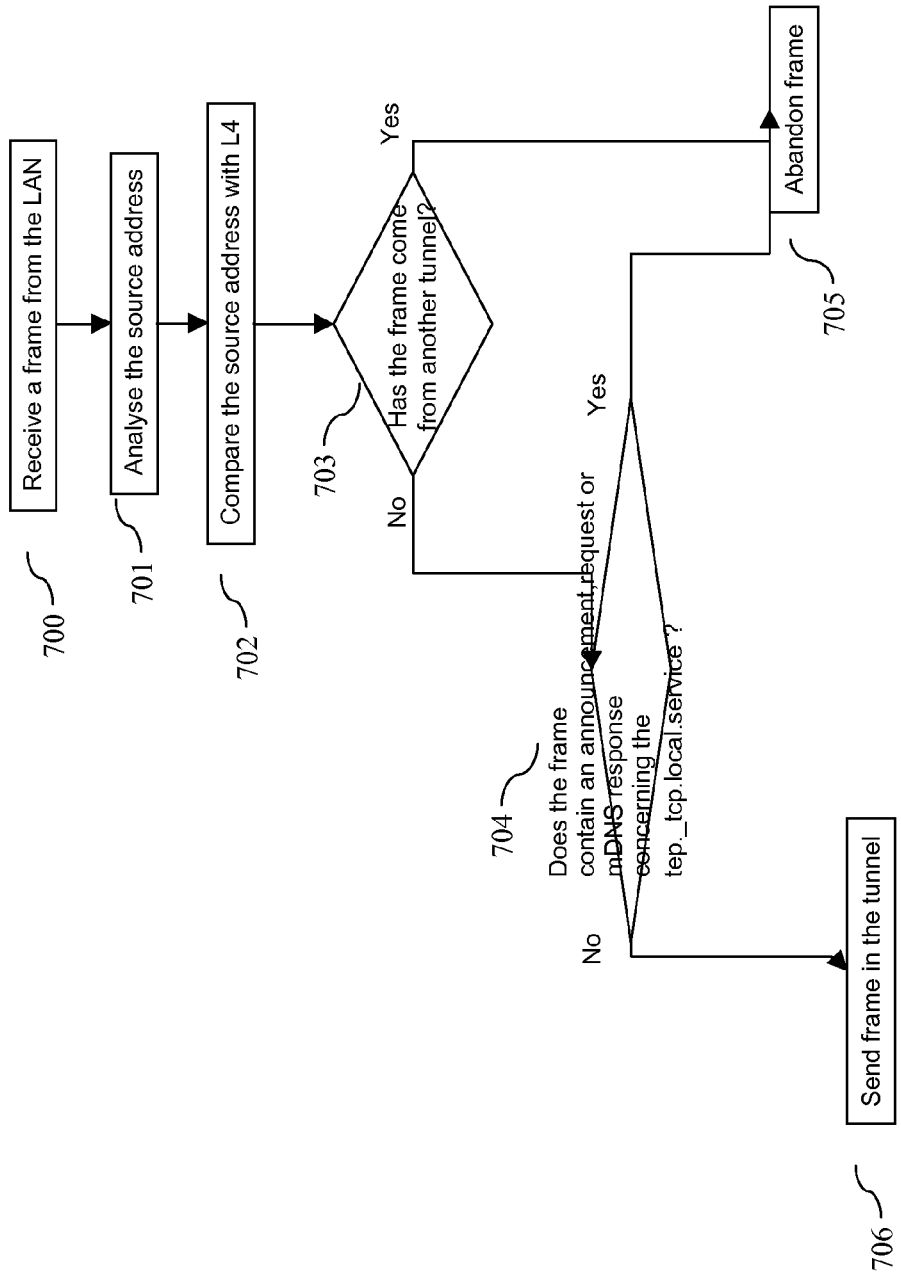
Figure 8:
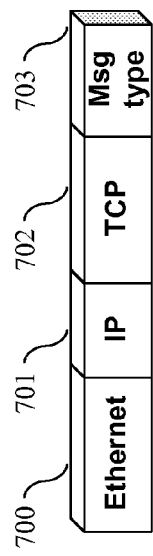
Figure 8:
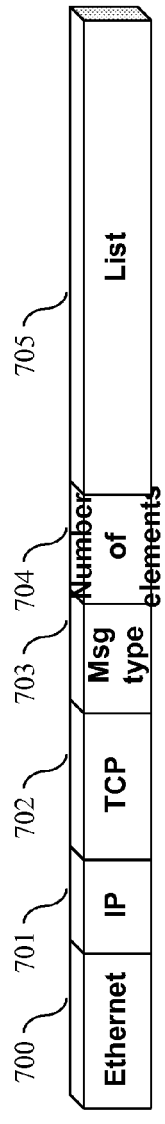
Figure 8:
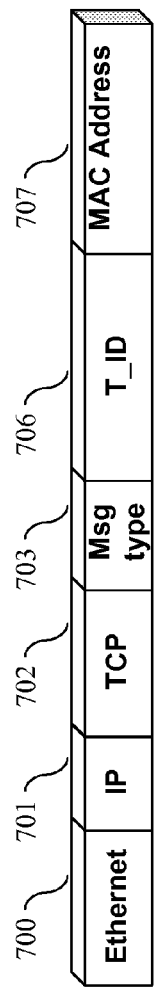
Figure 8:
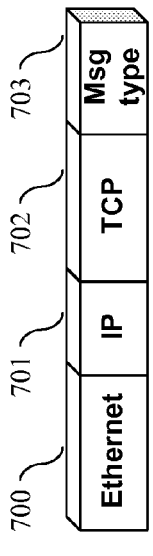
Figure 9:
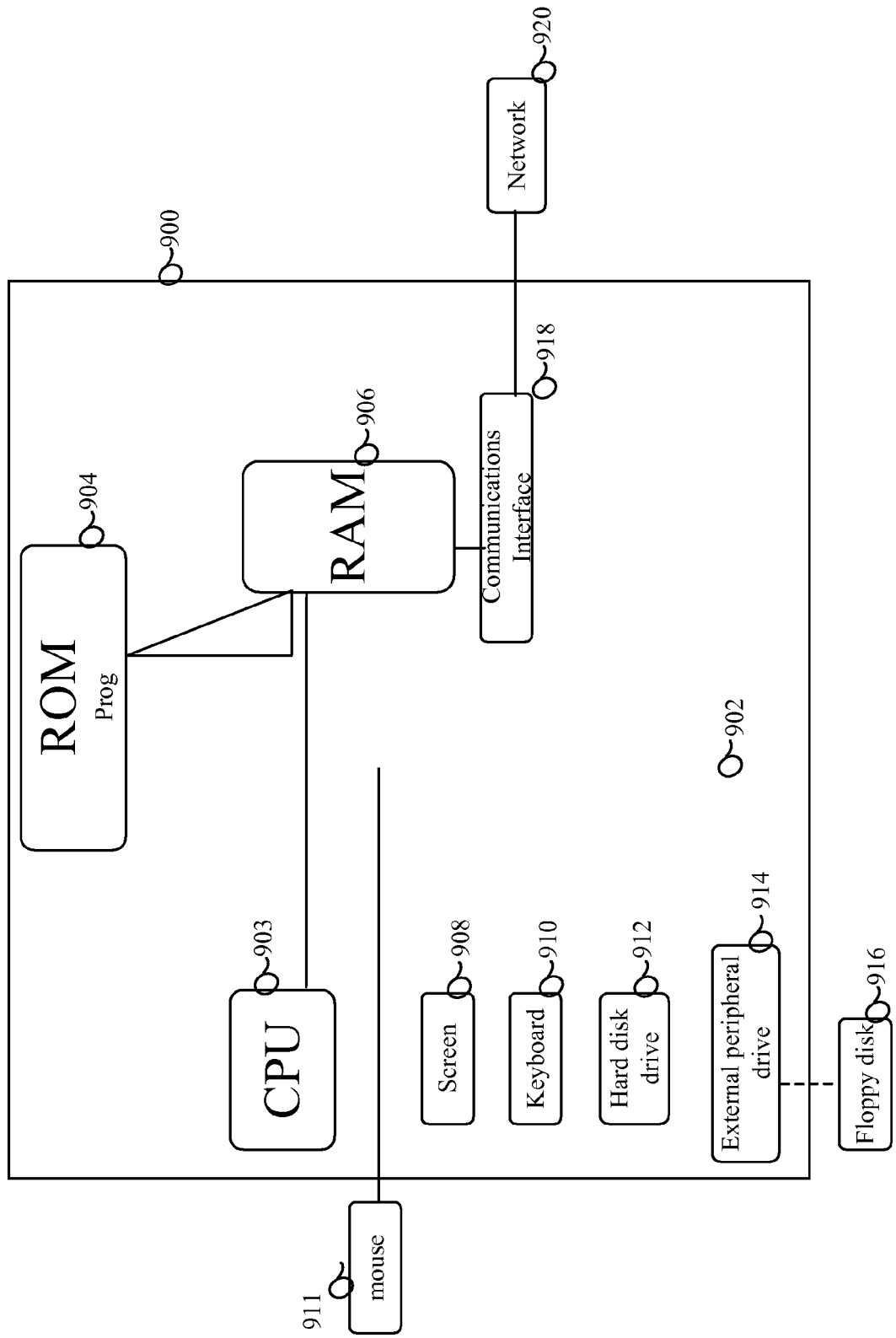

FIG. 6 presents an algorithm of reception of a frame coming from a tunnel according to a particular embodiment of the method according to the invention;

FIG. 7 presents an algorithm of reception by a tunnel endpoint of a frame coming from the local LAN to which the tunnel endpoint belongs, according to a particular embodiment of the method of the invention;

FIG. 8 shows the format of the different messages used in the context of the present invention;

FIG. 9 is a diagram of the generic tunnel endpoint capable of implementing the frame management method according to a particular embodiment of the invention.

DETAILED DESCRIPTION

In all the figures of the present document, identical elements and steps are designated by a same numerical reference.

The present invention relates to a technique for preventing data path loops through communications tunnels. The invention proposes the blocking of the transmission of a given frame coming from a first tunnel through a second tunnel connected to the local network LAN in which the first tunnel transmits the data frame. More specifically, should a plurality of tunnel endpoints be connected to a local LAN, the invention enables each of these tunnel endpoints to determine whether a frame, broadcast on the local LAN, has effectively originated from the local LAN or whether it comes from a remote LAN (i.e. whether the frame has arrived through a tunnel other than the one at which it is on the point of being transmitted), and thus to determine whether the frame should be transmitted to another LAN by means of a tunnel.

According to the general principle of the invention, therefore, a tunnel endpoint manages a list of Ethernet MAC addresses of apparatuses connected to the remote LAN (the one that is connected to the other tunnel endpoint). This list is transmitted to all the tunnel endpoints of the local LAN. Thus, before transmitting a frame on the tunnel that is attached to it, each tunnel endpoint of the local LAN can check to see whether the source address of this frame is included in the list of Ethernet MAC addresses of apparatuses mentioned here above. If there is positive verification, it means that the frame has reached the local LAN through another tunnel (in other words, the frame comes from a remote LAN) and the transmission of this frame through the tunnels associated with the tunnel endpoint considered is prevented.

Figure 1A:
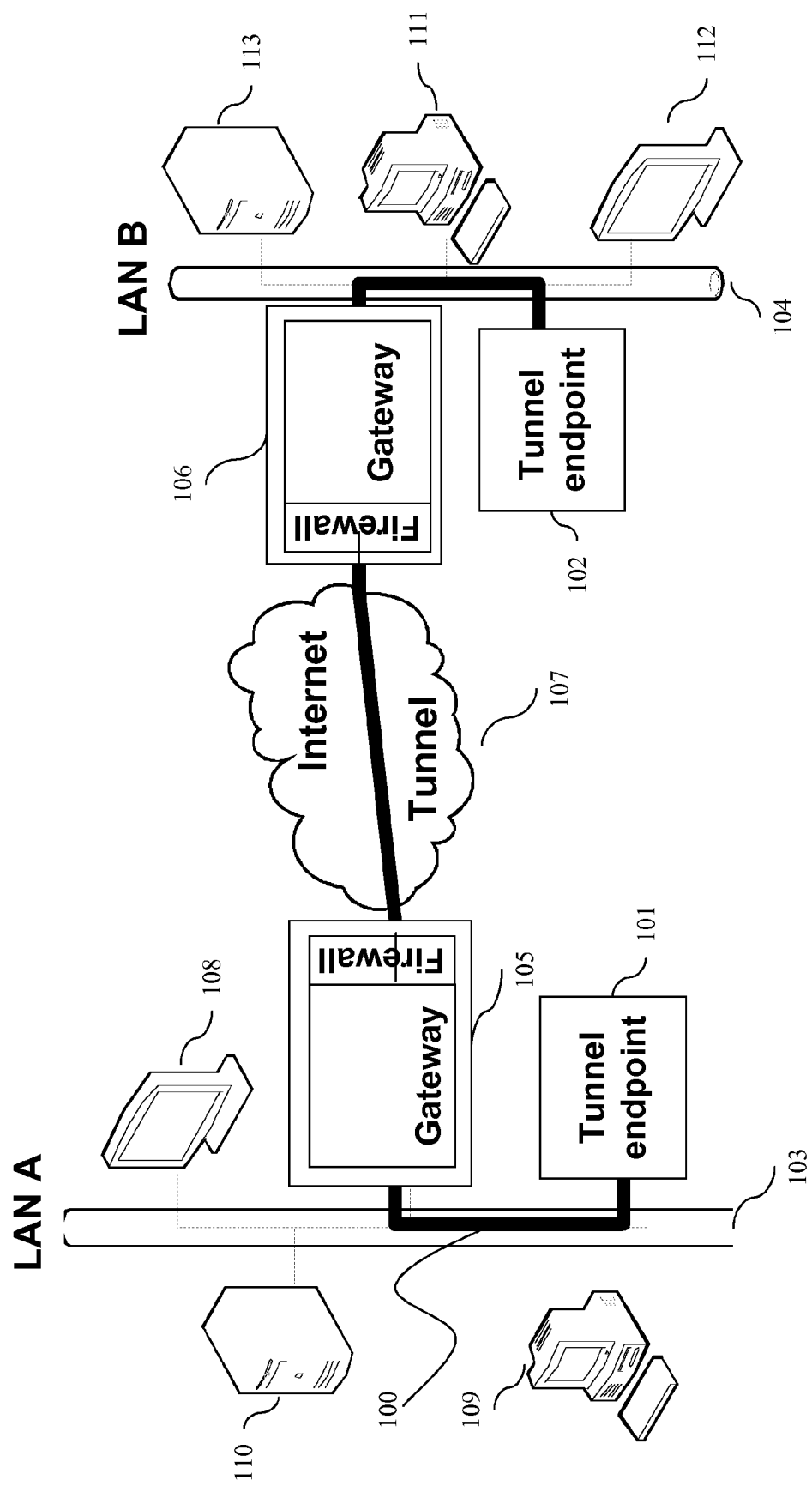

FIG. 1a illustrates a typical virtual private network (VPN) configuration implementing a tunnel 100 between a tunnel endpoint 101 and a tunnel endpoint 102 through a communications network 107 (Internet for example). This tunnel 100 interconnects two local area networks LAN A 103 and LAN B 104. Each of the local LANs 103 and 104 comprises a high-bit-rate Internet access apparatus (home gateway capable of integrating a firewall 105 and 106, PC type apparatuses 109 and 111, servers 110 and 113 enabling the storage and sharing of digital media such as audio, video and photo type media), as well as digital media restitution apparatuses 108 and 112. A tunnel endpoint can be integrated into an audiovisual apparatus such as a digital television set. It can also be present in a PC type apparatus in the form of a program performing the functions associated with this program.

Once the tunnel 100 is established, the apparatuses 108, 109 and 110 connected to the LAN A 103 are capable of communicating with the apparatuses 111, 112 and 113 connected to the LAN B 104. For example, the customer 108 connected to the LAN A 103 can communicate with the server 113 connected to the LAN B 104.

This FIG. 1a shows a simple communications network with only one tunnel but it is clear that a same tunnel endpoint may have to manage several tunnels (intended for an equivalent number of tunnel endpoints) to interconnect a first LAN to several other LANs and that a same LAN can include several tunnel endpoints. Furthermore, for the sake of simplification, Internet infrastructure apparatuses such as Internet routers have not being shown.

Figure 1B:
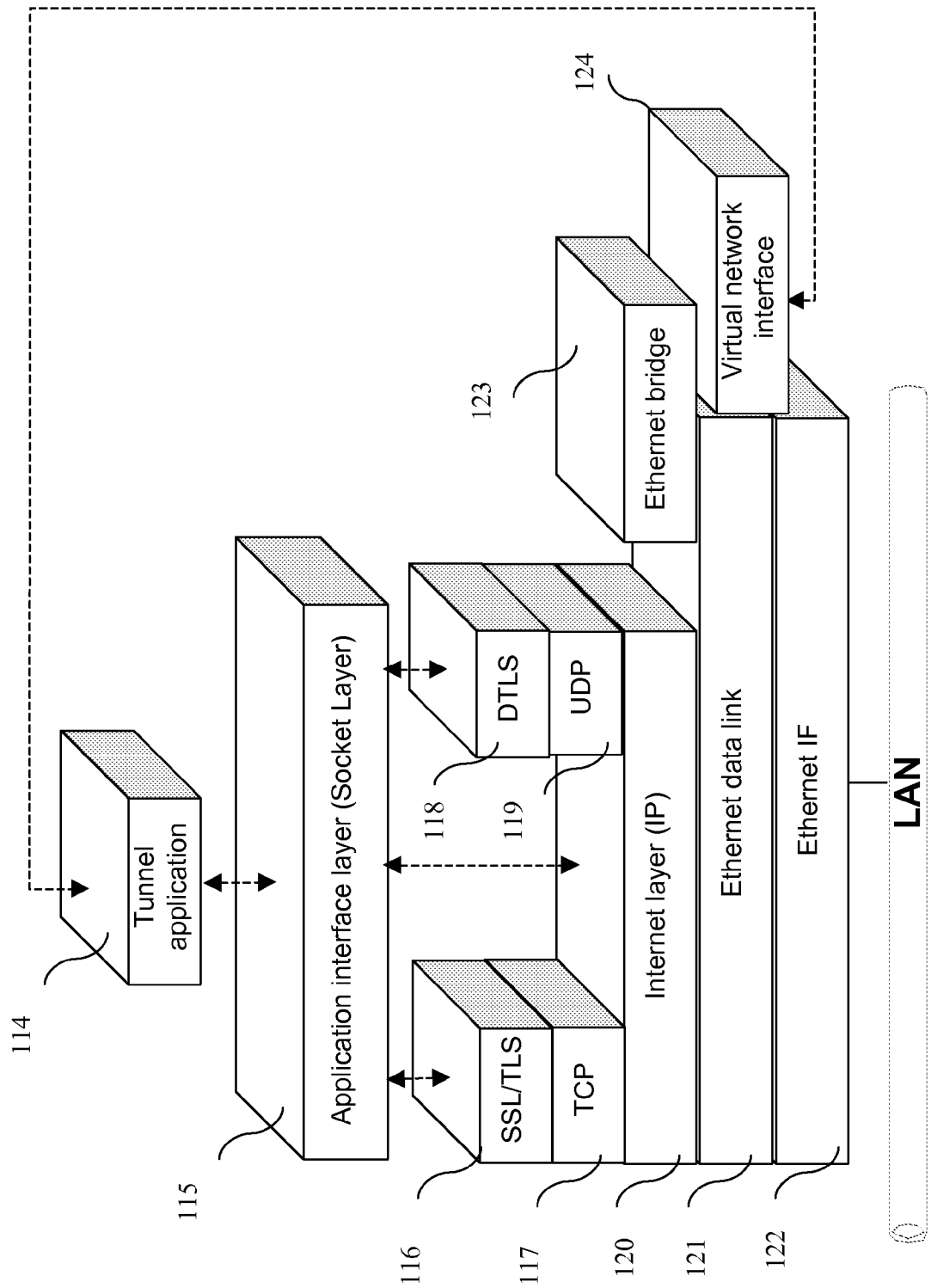

Referring to FIG. 1b, we shall now describe the path traveled by an Ethernet frame that comes from one of the apparatuses 108, 109, 110 (connected to the network LAN B 103) and will enter the tunnel 100. To do this, a layered model will be used describing the protocol layers needed to implement this tunnel 100. This model does not represent the protocol elements needed for functions other than the implementation of the tunnel. For example, the figure does not show the protocol elements associated with a UPnP architecture when a tunnel endpoint 101 is integrated into a UPnP compliant apparatus.

The tunnel endpoint 101 comprises an Ethernet physical interface 122 which hands over the Ethernet frames coming from the apparatuses 108, 109, 110 to the linking layer 121 for routing as follows: to the network layer 120 for the Ethernet frames intended for the apparatus comprising the tunnel endpoint or to the bridge layer ("bridge") 123 for the other Ethernet frames. The bridge layer 123 carries out the classic operations of an Ethernet bridge such as Ethernet frame filtering and the relaying of these frames towards the appropriate Ethernet output port or ports.

The filtering of the Ethernet frames is conventionally done by a bridge layer in verifying the presence of the destination address of a frame (single-destination frame) in the list. Indeed, each of the interfaces of the bridge has an associated list containing the MAC addresses of the nodes contactable by this interface. The term "nodes contactable" by a given bridge interface is understood to mean the nodes that are connected to the same LAN as the bridge interface or to a LAN connected with the local LAN by means of at least one bridge other than the given interface bridge. These lists are obtained by analysis of the packets coming from the LAN to which the interface is connected. The source addresses of the packets deposited in the LAN other than those deposited by the given interface are retrieved to form this list.

It must be noted that the list thus formed for a given bridge interface does not enable to distinguish the addresses of the nodes connected to the same LAN as the given interface from those of the nodes connected to another LAN separated by another bridge.

Thus, the destination address of a frame entering through one of the interfaces of a bridge is compared with the content of the lists associated with the other interfaces of this same bridge. If the destination address of a frame is present in one these lists, the frame is sent to its destination by means of the corresponding interface (only). If not, the frame is sent to all the interfaces of the bridge.

The bridge has the following attached to it: an Ethernet interface 121 and at least one virtual interface 124 having the behavior of an Ethernet controller. A virtual interface 124 is created for each tunnel instantiated by the application 114 to which it hands over the Ethernet frames which must travel on the respectively instantiated tunnels. Generally, the encapsulation protocol of the tunnel represented by the application 114 performs the operations needed to implement each tunnel, these operations comprising especially the configuration, filtering and encapsulation (formation of a tunnel packet) and the extraction of a frame. As shall be seen here below, the method of the invention is implemented by the application 114.

The frames received from the virtual interface 124 after processing by the application 114 are handed over in the form of a data packet (or frame) through an applications interface or socket 115 to a reliable TCP transport protocol 117 or a non-reliable UDP protocol 119, respectively secured by the SSL protocol 116 and DTLS protocol 118. After processing by a transport protocol to form the tunnel packet (or frame) this packet is passed on to the network layer 120. The IP datagram thus formed with the tunnel packet (or frame) can now be transmitted on the LAN through the link layer 121 and physical layer 122.

The reception of a frame from the tunnel 100 will follow the reverse route to the one presented here above in the tunnel endpoint.

Figure 2:
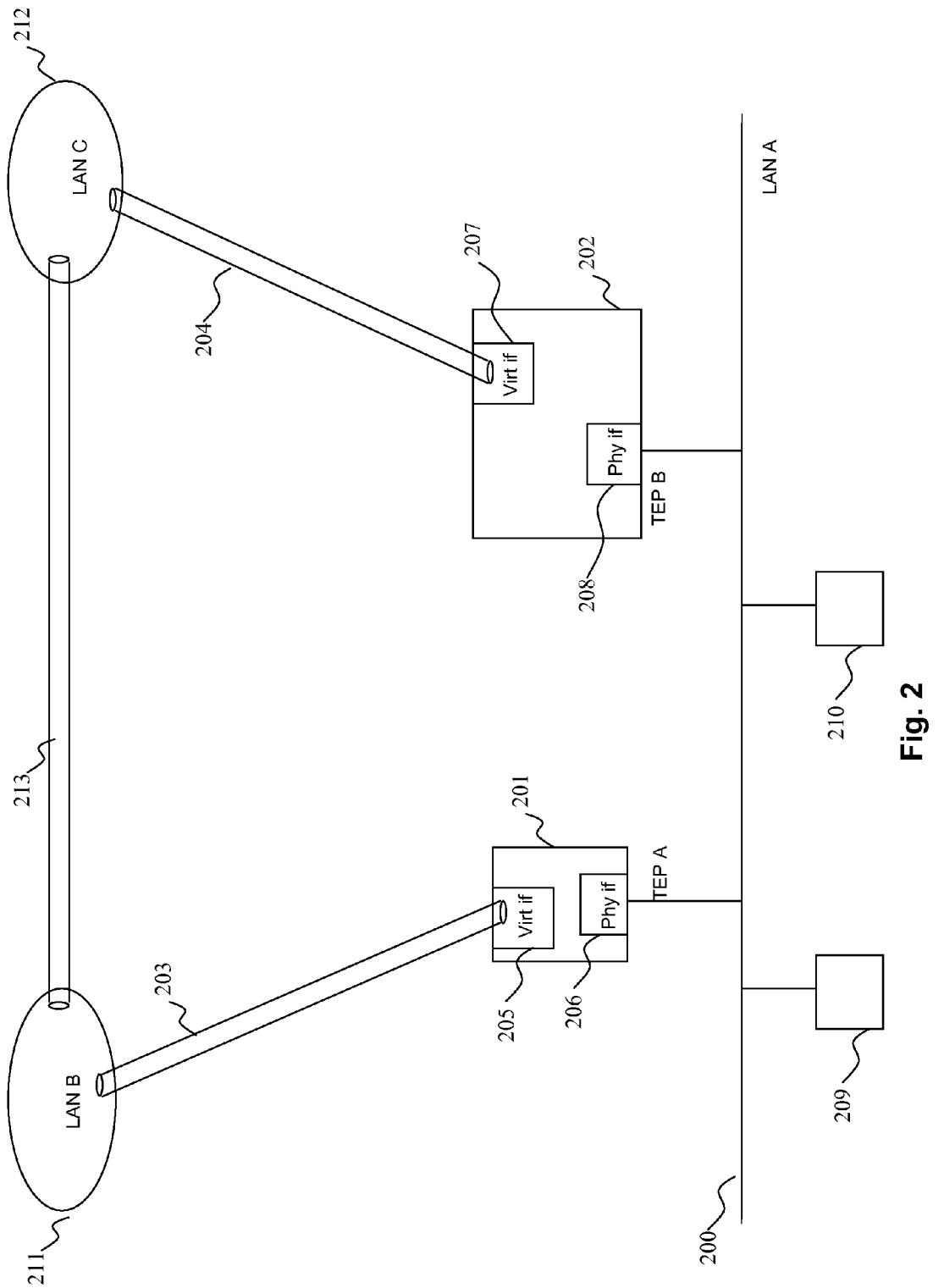
FIG. 2 shows an example of a configuration in which the present invention can be applied.

Referring to FIG. 2, we present an example of a configuration in which the present invention is applied.

As illustrated, a local LAN 200 referenced LAN A comprises two tunnel endpoints 201 and 202 and two apparatuses 209 and 210. The first tunnel endpoint 201 of the LAN A referenced TEP A, manages a first tunnel 203 going towards a first remote LAN 211 referenced LAN B. The second tunnel endpoint 202 of the network LAN A, referenced TEP B, manages a second tunnel 204 going towards a second remote LAN 212, referenced LAN C. The networks LAN B and LAN C are connected to each other by means of a third tunnel 213. The first tunnel 203, second tunnel 204 and third tunnel 213 form a complete mesh and are capable of creating a data path loop between the networks LAN A, LAN B and LAN C. In this example, the method of the invention is implemented on the network LAN A so as to eliminate this data path loop. It could of course be implemented similarly on the network LAN B and/or the network LAN C.

Conventionally, each tunnel endpoint (201 and 202) of the network LAN A comprises a virtual interface (205 and 207) enabling it to manage the tunnel associated with it and a physical interface (206 and 208) enabling it to manage its connection to the LAN A network. Each tunnel endpoint implements one Ethernet bridge function so as to enable the virtual interface 205 and physical interface 206 and the virtual interface 207 and physical interface 208 to be put into communication. Each virtual interface has an identifier associated with it (a single identifier within a same tunnel endpoint) referenced "VI_id" used here below in the description to identify a tunnel and its associated resources within a tunnel endpoint.

Figure 3:
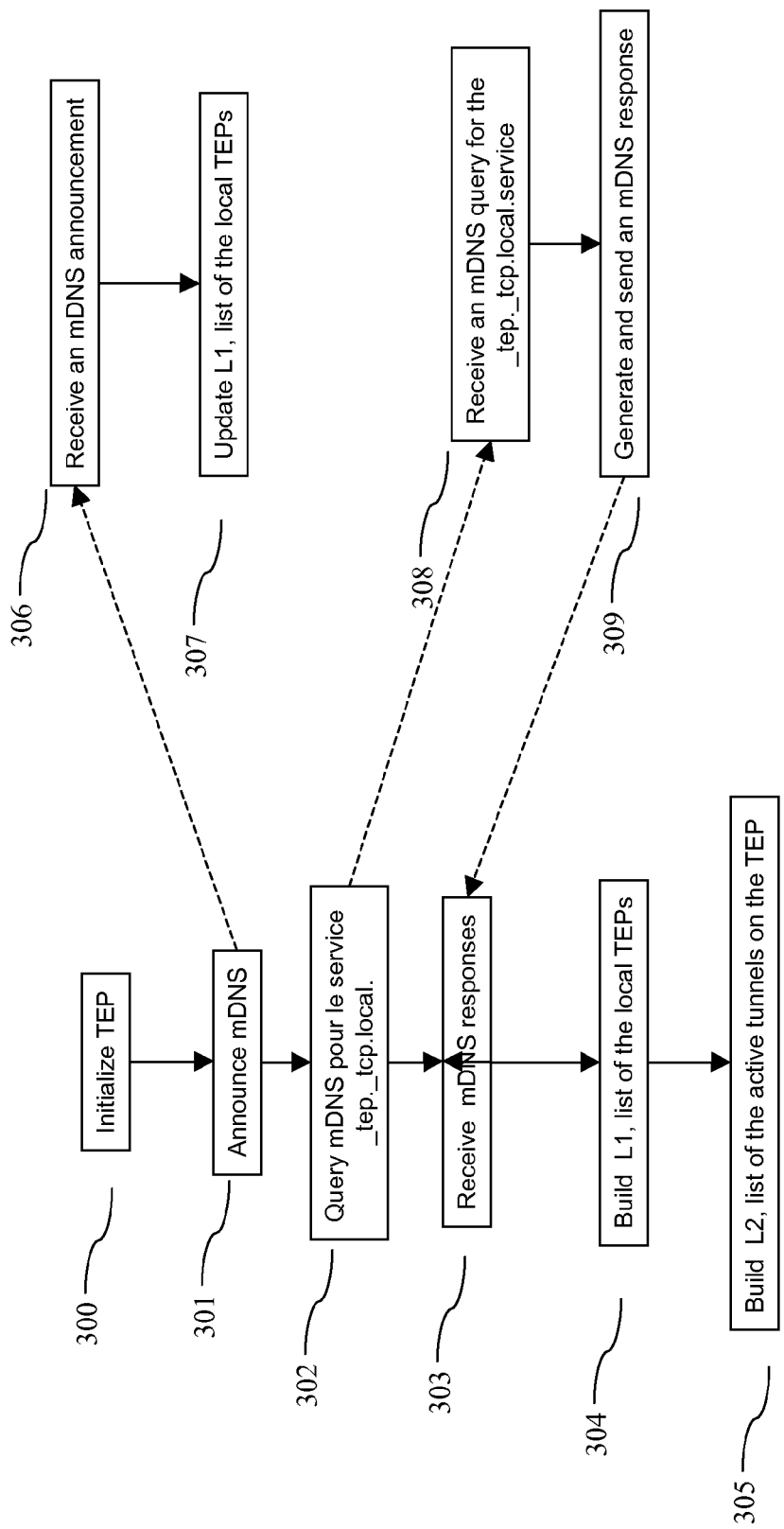
FIG. 3 is a flow chart illustrating the steps of the method according to one particular embodiment of the invention, executed by a tunnel endpoint at initialization.

Referring now to FIG. 3 we present a flowchart illustrating the steps of the method according to a particular embodiment of the invention, executed by a tunnel endpoint (for example the one referenced TEP A in FIG. 2) at initialization.

At the step 300, the tunnel endpoint TEP A is initialized. According to the invention, the tunnel endpoint TEP A must make itself known to the other tunnel endpoints (for example the tunnel endpoint referenced TEP B in FIG. 2) potentially present in the local LAN (LAN A) and make an exhaustive count of the other tunnel endpoints. To do so, each tunnel endpoint implements the multicast domain name server (mDNS) and DNS-based service discovery (DNS-SD) protocols as described in the context of the network apparatus configuration protocol "Zeroconf". The above-mentioned protocols are well known to those skilled in the art and are therefore not described in detail. The different tunnel endpoints will make themselves known by means of these protocols, each publishing an entity of the "_tep._tcp.local." service. This entity must have a single name. Thus, for example, this name is obtained by the concatenation of the field "_TEP-" and the MAC address of the tunnel endpoint concerned. For example, the service entity "_tep._tcp.local." present at the tunnel endpoint whose MAC address is the address "5E.FF.56.A2.AF.15" will have the name "_TEP-5EFF56A2AF15". It can be noted that a probing step for verifying the uniqueness of the mDNS protocol is not necessary because the uniqueness of the MAC address ensures the uniqueness of the name of the entity.

It is important to note that the steps 301 to 305 described here below are executed by the tunnel endpoint TEP A and the steps 306 to 309 by the other tunnel endpoints present in the network LAN A, for example the tunnel endpoint TEP B.

At the step 301, an mDNS service announcement is generated. This announcement is then transmitted, in the form of a multicast message to the other tunnel endpoints present on the network LAN A, for example the tunnel endpoint TEP B. This multicast message has a group destination address or multicast address. Each node of a network interested in this type of message is sensitive to this address. In order to ensure that only the tunnel endpoints present in the LAN A receive this announcement (as well as the query generated at the step 302), the frames containing a group address of this kind will be filtered at the input of the tunnels (as described here below with reference to the step 704 of FIG. 7).

At the step 302, an mDNS query is generated for the "_tep._tcp.local." service. This query is then transmitted in the form of a multicast message to the other tunnel endpoints present in the network LAN A, for example the tunnel endpoint TEP B.

At the step 308, each of the other tunnel endpoints present on the LAN A network, for example the tunnel endpoint TEP B, receives the mDNS query generated at the step 302.

At the step 309, an mDNS response is generated. This mDNS response comprises the name of its "_tep_.tcp.local." service entity. In the present example, the name is "_TEP-5EFF56A2AF15". This response is then sent to the tunnel endpoint TEP A. Then, the operation continues at the step 303.

At the step 303, an mDNS response is received from each of the other tunnel endpoints present in the LAN A network, for example the tunnel endpoint TEP B. Each response comprises a name of its service entity "_tep._tcp.local". The tunnel endpoint TEP A therefore has a list of names of the service entities "_tep._tcp.local" presented on the LAN A network. Thus, the tunnel endpoint TEP A can extract the MAC addresses of the other tunnel endpoints from this list (these MAC addresses being contained in the name of the entities).

At the step 304, a list L1 (called a list of local tunnel endpoints) is generated. This list comprises the MAC addresses of all of the tunnel endpoints (TEP A, TEP B, etc.) present in the network LAN A from the MAC addresses extracted at the step 303.

At the step 305, a list L2 (called a list of the tunnels active in the tunnel endpoint) is generated. This list comprises one input per active tunnel on the tunnel endpoint TEP A. This list L2 is empty for the time being.

At the step 306, each of the other tunnel endpoints present on the LAN A, for example the tunnel endpoint TEP B, receives the mDNS service announcement generated at a step 301.

At the step 307, the list L1 generated at the step 304 is updated.

Figure 4:
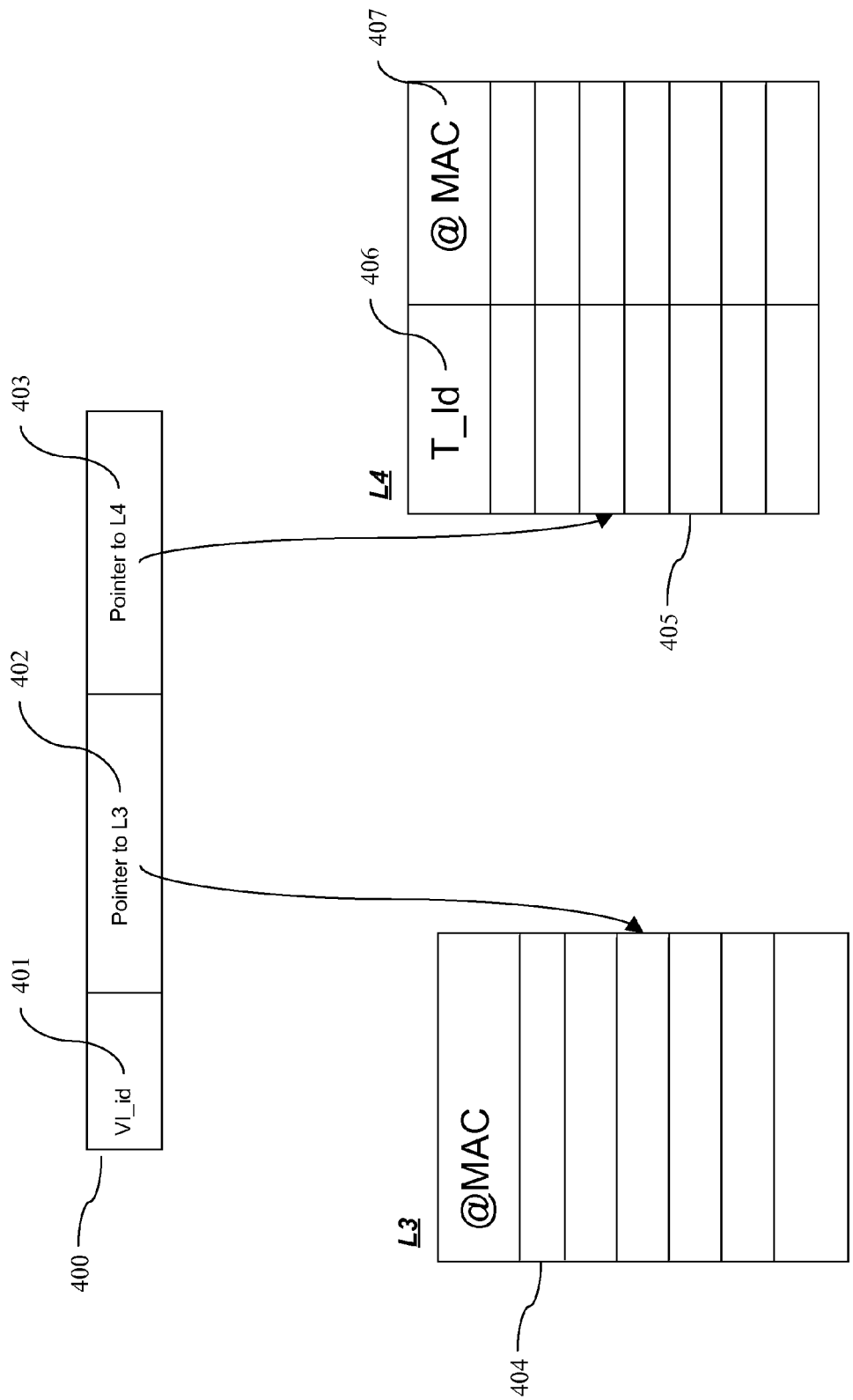
FIG. 4 shows a format, according to a particular embodiment of the invention, of an entry of the list of active tunnels on a tunnel endpoint

FIG. 4 presents a format, according to a particular embodiment of the invention, of an entry 400 of the list of active tunnels on the tunnel endpoint (list L2 generated at the step 305) comprising:

an identification field 401 comprising the identifier VI_id of the tunnel associated with the input 400, called a current tunnel;

a field 402 comprising a pointer which points to a list L3 404 itself comprising MAC addresses of apparatuses connected to a remote LAN, this remote LAN being connected to the current tunnel. In another embodiment, the list L3 may contain pointers to other lists, enabling the management of different categories of addresses or apparatuses. For example, referring to the diagram of FIG. 2, for the tunnel endpoint TEP B, the list L3 associated with the tunnel 204 (current tunnel) comprises the MAC addresses of the apparatuses connected to the LAN C 212;

a field 403 comprising a pointer which points to a list L4 405 itself comprising MAC addresses of apparatuses connected to other remote LANs, these remote LANs being connected to other tunnels (distinct from the current tunnel) of the communications network. The list L4 can, in another embodiment, contain pointers to other lists enabling the management of different categories of addresses or apparatuses. For example, referring to the diagram of FIG. 2, for the tunnel endpoint TEP B, the list L4 comprises the MAC addresses of the apparatuses connected to the LAN B 211. More specifically, the list L4 comprises two fields:

a first field 407 comprising a MAC address of an apparatus connected to a remote LAN (distinct from the one connected to the current tunnel);

a second field 406 comprising an identifier, referenced "T_id" used to identify the tunnel through which the apparatus associated with the MAC address contained in the field 407 is accessible. In one particular embodiment, the identifier T_id is obtained by the concatenation of an identifier TEP_id and the identifier VI_id representing the virtual interface corresponding to this tunnel in the tunnel endpoint associated with it on the local LAN. The identifier TEP_id is an identifier of the tunnel endpoint such as for example its MAC address. The combination of the identifiers TEP_id and VI_id enables the unambiguous identification of a tunnel connected to a local LAN.

Figure 5:
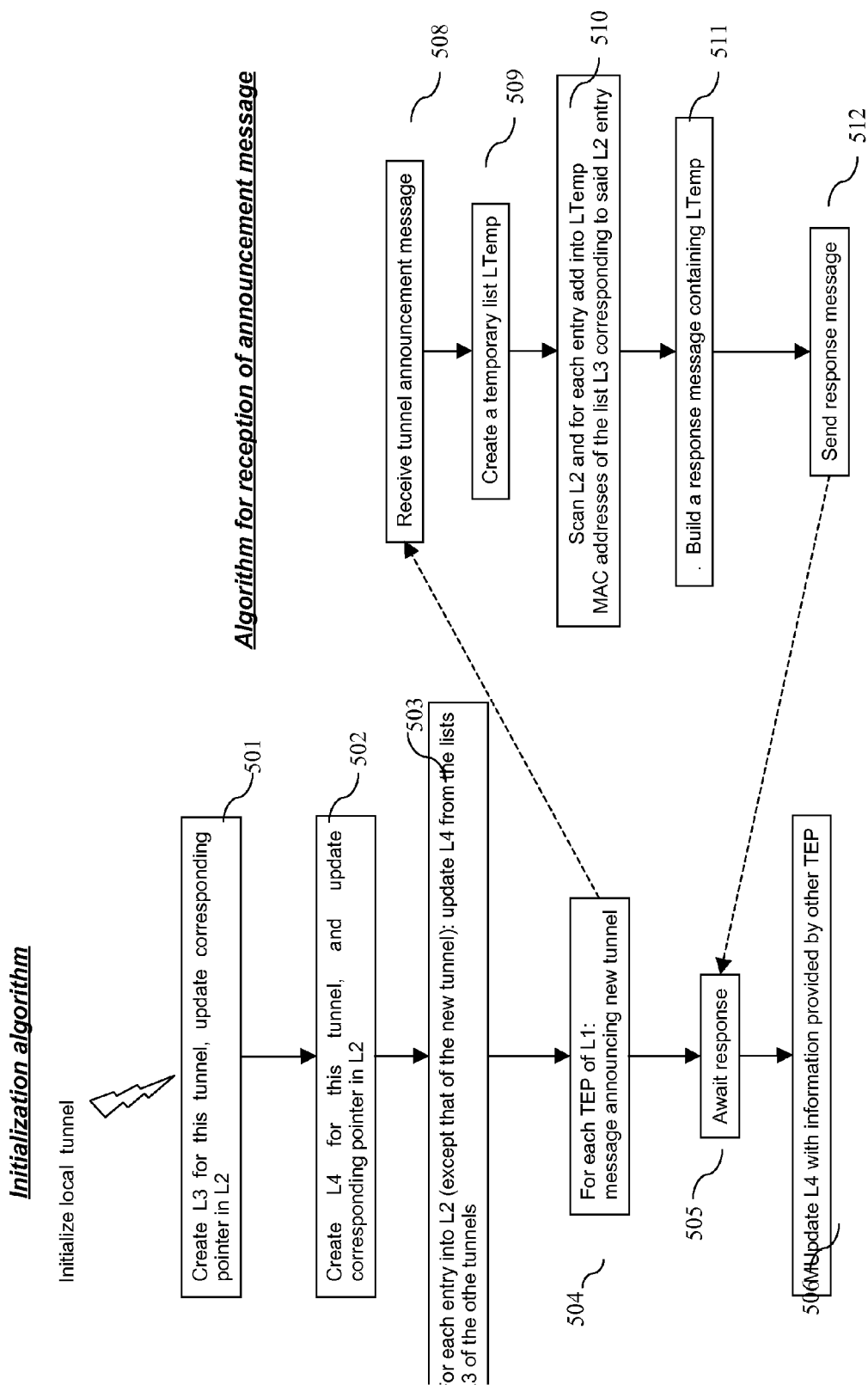
FIG. 5 is a flow chart illustrating the steps of the method according to a particular embodiment of the invention, executed by a tunnel endpoint after a new tunnel associated with this tunnel endpoint has been successfully set up.

Referring now to FIG. 5, we present a flowchart illustrating the steps of the method according to a particular embodiment of the invention, executed by a current tunnel endpoint (for example the one referenced TEP A in FIG. 2) after a new tunnel has been set up successfully.

At the step 501, the list L3 associated with the new tunnel is generated and a new entry is created in the list L2. More specifically, the MAC field 402 of this new entry is initialized with a pointer which points to the list L3 generated and associated with the new tunnel.

At the step 502, the list L4 associated with the new tunnel is generated, and the MAC field 403 of the new input of the L2 (created at the step 501) is initialized with a pointer that points to the list L4 generated and associated with the new tunnel.

At the step 503, the list L2 is scanned and, for each entry of the list L2 (other than the one associated with the new tunnel), the list L4 associated with the new tunnel is updated on the basis of the information contained in the lists L3 associated with the other tunnels of the local LAN (LAN A). For example, referring to the diagram of FIG. 2, given that the list L2 of the tunnel endpoint TEP B has only one input corresponding to the tunnel 204, no new entry is added to the list L4.

At the step 504, the list L1 of the tunnel endpoints present on the local LAN (LAN A) is scanned. For each entry of the list L1, a message announcing the new tunnel is sent to the corresponding tunnel endpoint called a reception tunnel endpoint.

At the step 508, the reception tunnel endpoint receives the message announcing the new tunnel.

At the step 509, the reception tunnel endpoint generates a temporary list "LTemp" which, once filled, will contain all the MAC addresses of the apparatuses connected to the remote LANs accessible by tunnels starting from this same tunnel endpoint.

At the step 510, the list L2 is scanned and for each entry of the list L2, the content of the corresponding list L3 is added to the temporary list LTemp. The format of the entries of the temporary list LTemp is the same as that of the entries of the list L4 (previously described with reference to FIG. 4) Thus, each entry of the temporary list LTemp comprises first and second fields. The first field consists of the identifier of the tunnel concerned (determined by means of a pointer on the lists L1 and L2 used to obtain the information T_id which is the concatenation of the tunnel endpoint identifier TEP_id and of the tunnel endpoint virtual interface identifier VI_id). The second field contains the MAC addresses of the devices present in the lists L3 scanned.

At the step 511, a response message is generated from the temporary list LTemp (filled at the step 510).

At the step 512, the response message (generated at the step 511) is sent to the current tunnel endpoint. Then, the operation goes to the step 505.

At the step 505, the response message coming from the reception tunnel endpoint is received.

At the step 506, the list L4 is complemented with the MAC addresses contained in the response message (received at the step 505). By way of an example, referring to the diagram of FIG. 2, the list L4 of the tunnel 204 will be complemented with the MAC addresses contained in the list L3 of the tunnel 203.

Referring now to FIG. 6, we present an algorithm for the reception of a frame coming from a tunnel according to a particular embodiment of the method of the invention.

When a frame reaches a tunnel endpoint (here below called a current tunnel endpoint) from a tunnel, a check is made to see whether its source address is known, i.e. whether it is present in the list L3 associated with the tunnel in the current tunnel endpoint so that in the event of a negative check, the concerned list L3 of MAC addresses is updated as are the other tunnel endpoints present on the local LAN.

At the step 600, the frame coming from the tunnel is received and then its source address is analyzed. In a first embodiment, the frame received from the tunnel is temporarily blocked by the current tunnel endpoint so as to update all the lists of MAC addresses of the other tunnel endpoints present on the local LAN before the frame reaches them. This blocking may have a duration equal to a predefined timeout estimated so as to leave a sufficient time margin for the other tunnel endpoints present on the local LAN to carry out the necessary updating of their list of addresses.

In a second embodiment as described here below in the step 605, this blocking lasts for the time in which an acknowledgment of the updating of the lists L4 is received from each of the other tunnel endpoints of the local LAN.

In a third embodiment, the current tunnel endpoint first of all sends a message for updating the lists L4 as described here below and then the frame that has activated this updating of the lists L4. It is then the responsibility of the tunnel endpoints other than the current tunnel endpoint to carry out the updating of the lists L4 before the processing of the frame in question. This can be done by blocking the frame (for which the device identified by the source address contained in the frame has not been found in one of the internal lists L4) for a determined period of time, estimated so as to leave a sufficient time margin for the current tunnel endpoint to transmit (or retransmit) the updating of the lists L4.

At the step 601, a check is made to see whether the source address of the frame is received is included in the list L3 associated with the frame incoming tunnel. In the event of a negative check, the operation passes to the step 602. If not, the operation passes to the step 606. As indicated here above, the list L3 comprises the MAC addresses of the apparatuses connected to the remote LAN, accessible through the frame incoming tunnel. It will be noted that to find the list L3, the operation uses the pointer of the first MAC address field 402 of the entry of the list L2 associated with the frame incoming tunnel (which is identified by the identifier VI_id of the virtual interface corresponding to this incoming tunnel, the identifier VI_id thus enabling the selection of the right input in the list L2).

In a step 602, the list L3 is updated with the MAC address contained in the field representing the source address of the received frame. In other words, the source address of the frame is added to the list L3.

At the step 603, the list L2 is scanned and for each entry of the list L2 (other than the one associated with the frame incoming tunnel) the list L4 associated with the frame incoming tunnel is updated as follows:

the field 406 is initialized with the identifier T_id of the frame incoming tunnel formed by the identifier TEP_id of the current tunnel endpoint and the identifier VI_id of the frame incoming tunnel;

the field 407 is initialized with the source address of the received frame, i.e. the MAC address of the device that has sent the frame.

At the step 604, the list L1 of the tunnel endpoint present in the local LAN is scanned. For each input of the list L1, each of the other tunnel endpoints present in the local LAN is sent a message for updating the lists L4, comprising the MAC address of the new device detected and the identifier T_id of the tunnel by which the device is accessible from the local LAN of the current tunnel endpoint.

At the step 608, each of the other tunnel endpoints present on the local LAN receives the message for updating the list L4 (sent at the step 604 by the current tunnel endpoint).

At the step 609, each of the other tunnel endpoints scans the list L2 associated with it. For each entry of the list L2, the MAC address and the identifier T_id contained in the updating message (received at the step 608) is added to the list L4 (associated with the given tunnel endpoint).

At the step 610, each of the other tunnel endpoints sends a response message (transaction acknowledgment) to the current tunnel endpoint. Then, the operation continues to the step 605. It will be noted that the response message must be sent only after the updating of all the lists L4, the updating of these lists preferably having to be done before the received frame has been sent on the local LAN by the current tunnel endpoint.

At the step 605, the current tunnel endpoint receives a response message from each of the other tunnel endpoints.

At the step 606, the received frame which has been temporarily blocked (step 600) is unblocked. The unblocked frame is then routed by the bridge function of the current tunnel endpoint to the local LAN but not to another tunnel linked to the current tunnel endpoint.

It will be noted that in a second embodiment, it is possible to envisage scanning the list L4 (listing the MAC source addresses of the apparatuses situated on other LAN networks accessible by means of other tunnels) before unblocking the received frame so as to verify that the destination address of the frame is not there. In the event of a negative check (i.e. if the destination address is in the list L4), it can be deduced that the frame received is intended for another remote LAN network and can therefore be destroyed.

Referring to FIG. 7, we now present an algorithm for reception of a frame broadcast on the local LAN according to a particular embodiment of the method of the invention. The steps described here below are implemented by a tunnel endpoint.

At the step 700, a frame broadcast on a local LAN, potentially intended for a tunnel (called a destination tunnel), is received.

At the step 701, the source address of the received frame is retrieved.

At the step 702, the source address of the frame received is compared with the entries of the list L4 associated with the destination tunnel. It can be noted that to find the retrieved list L4, the pointer of the second MAC address field 403 of the entry of the list L2 associated with the destination tunnel (identified by the identifier VI_id of the virtual interface of the bridge that has received the frame) is used.

At the step 703, a check is made to see whether the source address of the received frame is included in the list L4 associated with the destination tunnel. In the event of a negative check, the operation passes to the step 704. If not, it passes to the step 705. It may be recalled that, if the received frame is included in the list L4 (in the event of positive checks), it means that the apparatus that has sent the frame is not on the local LAN but on a LAN situated at the other end of one of the tunnels starting from the local LAN. In other words, the frame has reached the local LAN through another tunnel.

At the step 704, a check is made to see whether the frame contains an mDNS announcement of "_tep._tcp.local." service, an mDNS service query "_tep._tcp.local." or a response of this type of query (a multicast frame for the announcement of the query, single destination for the response, the fields of which are formatted according to the mDNS specifications). In the event of negative verification, the operation passes to the step 706. If not, it passes to the step 705. The mDNS "_tep._tcp.local." service queries are filtered at the entry to the tunnel because, as described here above, they enable the tunnel endpoints of a same LAN to know each other as belonging to the same LAN. They should therefore not pass from one LAN to another through the tunnels.

At the step 706, the transmission of the frame through the destination tunnel is authorized.

At the step 705, the transmission of the frame through the destination tunnel is prevented, and this frame is destroyed.

More generally, the tunnel endpoints connected to a same local LAN communicate with one another by means of the TCP/IP protocol.

FIG. 8 presents the formats of the difference messages used in the context of the present invention.

The announcement messages M1 (described with reference to FIG. 5) and the response messages M4 responding to an updating of the list L4 (described with reference to FIG. 6) comprise:

an Ethernet header 700;
an IP header 701;
a TCP header 702; and
a "type of message" field 703. As we shall see here below, this field is present in all the messages M1, M2, M3 and M4. The "type of message" field 703 is used to identify the type of message and take a different value depending on the type of message identified.

The response messages M2 to an announcement message (described with reference to FIG. 5) comprise:

an Ethernet header 700;
an IP header 701;
a TCP header 702;
a "type of message" field 703 (described here above);

a "number of elements" field 704. This field comprises the number of elements present in the list contained in a field "list" 705 (described here below); and the "list" field 705. This field comprises a list of elements used in the same format as the elements of the list L4. The building and the content of this list must be described now with reference to FIG. 5.

The messages M3 for updating the list L4 (described with reference to FIG. 6) comprise:

an Ethernet header 700;
an IP entity 701;
a TCP header 702;
a "type of message" field 703 (described here above);
a "T_ID" field 706; and
a "MAC address" field 707.

The content and use of each of the fields 706 and 707 are described with reference to FIG. 6 and correspond to the same format as the elements of the list L4.

It can be noted that, in one variant of the particular embodiment of the invention, a message M3 for updating the list L4 (described with reference to FIG. 6) may include several elements using the same format as the elements of the list L4. This is the case for example when several messages originating from several sender devices that have not yet been listed reach a LAN through a tunnel by means of a tunnel endpoint and when this tunnel endpoint combines the announcements of the new devices to be listed in one single message M3. In this case, the M3 type message has a format equivalent to that of the M2 type of message, the "type of message" field 703 enabling these messages to be dissociated from each other.

Referring to FIG. 9, a drawing of a genetic tunnel endpoint 900 is shown. This tunnel endpoint is capable of implementing the method of frame management according to one embodiment of the invention.

For example, the tunnel endpoints 101 and 102 (see FIG. 1a) are identical to the generic tunnel endpoint 900.

This generic tunnel endpoint 900 may be connected in particular to any means for the storage of images, videos or sound delivering multimedia information to the generic tunnel endpoint 900.

Thus, the generic tunnel endpoint 900 has a communications bus 902 to which the following are connected:

a central processing unit 903 (for example a microprocessor referenced CPU);

a read-only memory 904 referenced ROM capable of comprising the above-mentioned software program or programs and referenced Prog;

a random-access memory 906 (cache memory referenced RAM) comprising registers adapted to recording variables and parameters created and modified in the course of execution by the above-mentioned software program or programs;

a screen 908 used to view the data and/or serve as a graphics interface with the network administrator who could interact with the software program or programs according to the invention using a keyboard 910 or any other means such as a pointing device as for example a mouse 911 or an optical pencil;

a communications interface 918 linked to a distributed communications network 920, for example the LAN 103, the interface being capable of transmitting and receiving all the data.

The generic tunnel endpoint 900 also has (but this is optional):

a hard disk 912 capable of comprising the above-mentioned software program or programs and referenced Prog;

an external peripheral player 914 capable of receiving a USB memory key 916 and reading and writing therein data processed or to be processed according to the resource reservation method of the particular embodiment of the invention. Naturally, instead of the USB memory key 916, it is possible to use any information carrier readable by a computer or a microprocessor, whether integrated or not integrated into the apparatus, possibly detachable and adapted to storing the software program or programs according to the particular embodiment of the invention (for example a compact disk (CD-ROM) or a memory card (Memory-Stick, CompactFlash, etc.)).

The communications bus 902 enables communication and interoperability between the different devices included in the generic tunnel endpoint 900 or connected to this apparatus. More generally, through the communications bus 902, the central processing unit 903 can communicate instructions to any device included in the generic tunnel endpoint 900 directly or by means of another device of the generic tunnel endpoint 900.

The executable code of the above-mentioned software program or each of the above-mentioned software programs enabling the generic tunnel endpoint 900 to implement the frame management method of the invention can be stored for example in the hard disk drive 902 or in the read-only memory 904.

The central processing unit 903 controls and directs the execution of the instructions or portions of software code of the software program or programs of the invention. When the equipment is powered on, the software program or programs which are stored in a non-volatile memory (for example the hard disk drive 912 or the read-only memory 904) are transferred to the random-access memory 906 which will then contain the executable code of the software program or programs of the invention, as well as registers to memorize the variables and parameters needed to implement the determining method of the invention.

It must be noted that the equipment comprising the tunnel endpoint according to the invention can also be a programmed apparatus. This apparatus then contains the code of the computer program or programs, for example contained in a closed-end form in an applications specific integrated circuit (ASIC).

The invention claimed is:

1. A method for managing frames in a global-area communications network which comprises a plurality of sub-networks linked to one another by tunnels at the ends of which there are tunnel endpoints, at least one of the sub-networks comprising at least one source device, wherein when a given tunnel endpoint receives, from a local sub-network, to which the tunnel endpoint is connected, a frame sent out by a source device in the global-area network, the given tunnel endpoint performs the following steps:

obtaining, from the frame, an address of the source device;
verifying that the address is included in a first list of addresses comprising addresses associated with source devices connected to remote sub-network or sub-networks distinct from the local sub-network; and
in the event of positive verification, discarding the frame, wherein the given tunnel endpoint obtains the first list of addresses in performing the following steps:
for each tunnel endpoint of the local sub-network, distinct from the given tunnel endpoint, obtaining a second list of addresses on the basis of information received from each tunnel endpoint, this second list of addresses comprising addresses associated with source devices belonging to the remote sub-network or sub-networks connected to the local sub-network via said tunnel endpoint;

determining a third list of addresses comprising addresses associated with source devices belonging to the remote sub-network or sub-networks connected to the local sub-network via the given tunnel endpoint; and generating the first list of addresses from the second and third lists of addresses.

2. The method according to claim 1, wherein when a tunnel endpoint receives a frame sent out by a source device, the frame reaches the tunnel endpoint by one of the tunnels, the incoming tunnel linking the sub-network to which the tunnel endpoint is connected to the remote sub-network to which the source device is connected, the tunnel endpoint performs the following steps:

obtaining, from the frame, a remote address corresponding to the address of the source device having sent the frame;

verifying that the remote address is included in a fourth list of addresses comprising addresses associated with source devices belonging to a remote sub-network linked by the incoming tunnel to the sub-network to which the tunnel endpoint is connected;

in the event of negative verification, updating the fourth list with the remote address; and wherein the first list of addresses is generated from:

the fourth list or lists of addresses managed by each tunnel endpoint of the local sub-network, distinct from the given tunnel endpoint, each fourth list managed by a distinct tunnel endpoint of the given tunnel endpoint being associated with a distinct incoming tunnel; and the fourth list or lists of addresses managed by the given tunnel endpoint, each fourth list managed by the given tunnel endpoint being associated with a distinct incoming tunnel.

3. The method according to claim 2, wherein, when a tunnel endpoint receives a frame coming from an incoming tunnel of which the tunnel endpoint is one endpoint, the tunnel endpoint engages a transmission delaying mechanism for transmitting the frame on the sub-network to which the tunnel end-point is connected, so long as each of the other tunnel endpoint has not been informed that the source device belongs to a remote sub-network linked, via the incoming tunnel, to the sub-network to which the tunnel endpoint is connected.

4. The method according to claim 1, wherein a tunnel endpoint sends each other tunnel endpoint of the sub-network to which said tunnel endpoint is connected a piece of information representing a presence of a new source device in a remote sub-network, the remote sub-network being linked, via the tunnel endpoint, to the sub-network to which the tunnel endpoint is connected.

5. A non-transitory computer-readable storage medium storing a computer program, which computer program comprises a set of instructions that, when executed by a computer, implement a method for managing frames in a global-area communications network which comprises a plurality of sub-networks linked to one another by tunnels at the ends of which there are tunnel endpoints, at least one of the sub-networks comprising at least one source device, wherein when a tunnel endpoint receives from a local sub-network, to which the tunnel endpoint is connected, a frame sent out by a source device in the global-area network, the tunnel endpoint performs the following steps:

obtaining, from the frame, an address of the source device;

verifying that the address is included in a first list of addresses comprising addresses associated with source devices connected to remote sub-network or sub-networks distinct from the local sub-network; and in the event of positive verification, discarding the frame, wherein the given tunnel endpoint obtains the first list of addresses in performing the following steps:

for each tunnel endpoint of the local sub-network, distinct from the given tunnel endpoint, obtaining a second list of addresses on the basis of information received from the each tunnel endpoint, this second list of addresses comprising addresses associated with source devices belonging to the remote sub-network or sub-networks connected to the local sub-network via the tunnel endpoint;

determining a third list of addresses comprising addresses associated with source devices belonging to the remote sub-network or sub-networks connected to the local sub-network via the given tunnel endpoint; and generating the first list of addresses from the second and third lists of addresses.

6. A tunnel endpoint designed for the managing frames in a global-area communications network, the network comprising a plurality of sub-networks linked to one another by tunnels at the ends of which there are tunnel endpoints, at least one of the sub-networks comprising at least one source device, said tunnel endpoint comprising means for receiving a frame coming from a local sub-network, to which said tunnel endpoint is connected, the frame being sent out by a source device in the global-area network, wherein said tunnel endpoint comprises:

means for obtaining, from the frame, an address of the source device;

verifying means for verifying that the address is included in a first list of addresses comprising addresses associated with source devices connected to remote sub-network or sub-networks distinct from the local sub-network;

means for discarding the frame, activated in the event of positive verification by said verifying means; and means for obtaining the first list of addresses themselves comprising:

means for obtaining, for each other tunnel endpoint of the local sub-network distinct from the given tunnel endpoint and on the basis of information received from the other tunnel endpoint, a second list of addresses comprising addresses associated with source devices belonging to remote sub-network or sub-networks connected to the local sub-network via the other tunnel endpoint;

means for determining a third list of addresses comprising addresses associated with source devices connected to remote sub-network or networks linked to the local sub-network via said tunnel endpoint; and means for generating the first list of addresses from the second and third list of addresses.

7. The tunnel endpoint according to claim 6, further comprising means for transmitting, to each other tunnel endpoint of the sub-network to which said tunnel endpoint is connected, a piece of information representing a presence of a new source device in a remote sub-network, the remote sub-network being linked via said tunnel endpoint, to the sub-network to which said tunnel endpoint is connected.

8. The tunnel endpoint according to claim 7, further comprising:

receiving means for receiving a frame coming from an incoming tunnel of which said tunnel endpoint is one end;

means for activating, upon reception of a frame by said receiving means, transmission delaying means for transmitting the frame on the local sub-network so long as each other tunnel endpoint of the local sub-network has not been informed that the source device is connected to a remote sub-network linked to the local sub-network by the incoming tunnel.

9. A method for managing frames in a global-area communications network which comprises a plurality of sub-networks linked to one another by bridges, at least one of the sub-networks comprising at least one source device, wherein when a given bridge portal receives, from a local sub-network, to which the bridge portal is connected, a frame sent out by a source device in the global-area network, the given bridge portal performs the following steps:

obtaining, from the frame, an address of the source device;

verifying that the address is included in a first list of addresses comprising addresses associated with source devices connected to remote sub-network or sub-networks distinct from the local sub-network; and in the event of positive verification, discarding the frame, wherein the given tunnel endpoint obtains the first list of addresses in performing the following steps:

for each tunnel endpoint of the local sub-network, distinct from the given tunnel endpoint, obtaining a second list of addresses on the basis of information received from the each tunnel endpoint, this second list of addresses comprising addresses associated with source devices belonging to the remote sub-network or sub-networks connected to the local sub-network via the tunnel endpoint;

determining a third list of addresses comprising addresses associated with source devices belonging to the remote sub-network or sub-networks connected to the local sub-network via the given tunnel endpoint; and generating the first list of addresses from the second and third lists of addresses.

* * * * *